（12）United States Patent
Wang et al.

(10) Patent No.: US 8,808,663 B2
(45) Date of Patent: Aug. 19, 2014

(54) HYDROGEN GENERATION USING COMPOSITIONS INCLUDING MAGNESIUM AND SILICON

(75) Inventors: Tao Wang, Burnaby (CA); Will Skrivan, Vancouver (CA); Joerg Zimmermann, Vancouver (CA); Sally Seaman, Vancouver (CA)

(73) Assignee: Societe BIC, Clichy Cedex (FR)

( * ) Notice: Subject to any disclaimer, the term of this patent is extended or adjusted under 35 U.S.C. 154(b) by 53 days.

(21) Appl. No.: 13/389,577

(22) PCT Filed: Aug. 12, 2010

(86) PCT No.: PCT/CA2010/001231
§ 371 (c)(1),
(2), (4) Date: Feb. 8, 2012

(87) PCT Pub. No.: WO2011/017801
PCT Pub. Date: Feb. 17, 2011

(65) Prior Publication Data
US 2012/0148486 A1 Jun. 14, 2012

Related U.S. Application Data

(60) Provisional application No. 61/233,408, filed on Aug. 12, 2009.

(51) Int. Cl.
*C01B 3/24* (2006.01)
*C01B 3/38* (2006.01)
*C01B 3/08* (2006.01)
*C01B 3/06* (2006.01)

(52) U.S. Cl.
CPC . *C01B 3/08* (2013.01); *C01B 3/065* (2013.01); *Y02E 60/362* (2013.01)
USPC .......................................... 423/650; 252/373

(58) Field of Classification Search
USPC ........................................................ 423/650
See application file for complete search history.

(56) References Cited

U.S. PATENT DOCUMENTS

| 6,582,676 | B2 | 6/2003 | Chaklader | |
|---|---|---|---|---|
| 2005/0232837 | A1* | 10/2005 | Troczynski et al. | 423/155 |
| 2010/0209338 | A1 | 8/2010 | Miki et al. | |

FOREIGN PATENT DOCUMENTS

| GB | 579246 A | 7/1974 |
|---|---|---|
| GB | 1378820 A | 12/1974 |
| JP | 2007326731 A | 12/2007 |
| WO | 2005097670 A1 | 10/2005 |

OTHER PUBLICATIONS

International Search Report and Written Opinion issued in connection with the corresponding International Application No. PCT/CA2010/001231 on Oct. 20, 2010.
Translated Abstract and Machine Translation of JP 2007-326731.
European Search Report issued in connection with the corresponding European Patent Application on Aug. 27, 2013.

* cited by examiner

*Primary Examiner* — Melvin C Mayes
*Assistant Examiner* — Kenneth Vaden
(74) *Attorney, Agent, or Firm* — The H.T. Than Law Group

(57) ABSTRACT

Embodiments relate to methods of generating hydrogen including contacting magnesium and silicon to form a mixture and reacting the mixture with an aqueous solution, sufficient to generate hydrogen. The solution can include water and salt.

20 Claims, 1 Drawing Sheet

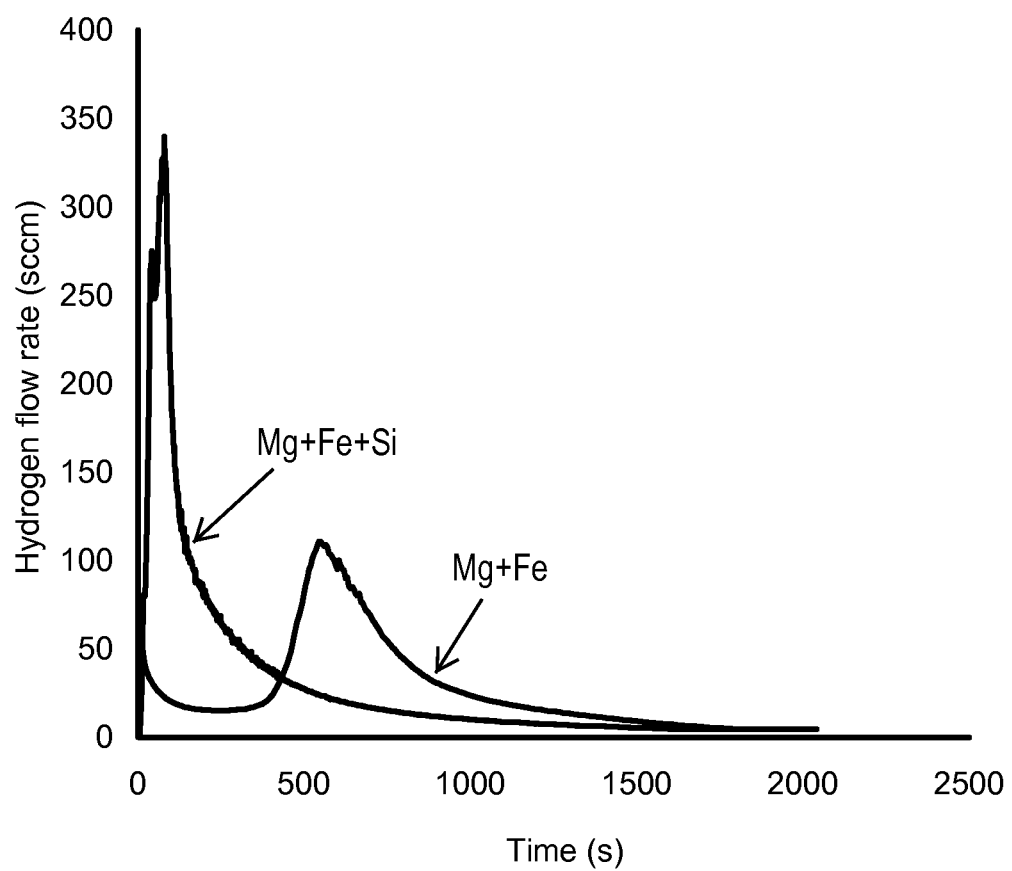

HYDROGEN GENERATION USING COMPOSITIONS INCLUDING MAGNESIUM AND SILICON

BACKGROUND

Hydrogen is increasingly being pursued as an alternative energy option for a variety of applications. In large scale applications, the use of hydrogen offers potential environmental advantages as concerns mount about carbon emissions, pollution and the long term supply stability of fossil fuels. In smaller scale applications (e.g. smartphones), the use of fuel cells and hydrogen fuel offers potential advantages over conventional lithium ion batteries with regards to run time and recharge time.

However, while abundant in the universe, on earth hydrogen generally must be prepared from a suitable precursor feedstock (e.g. methane) and is often viewed more as an energy carrier than an energy source. Further, it has proven to be a difficult challenge to transport and store hydrogen once prepared. Often then, hydrogen is transported and stored in the form of the precursor feedstock and is then converted to hydrogen closer to the point of use.

For consumer applications in particular, this requires a simple, economic, safe means for preparing hydrogen from a likewise simple, economic, and safe precursor feedstock. For example, while methane reformation is a common method for the large scale production of hydrogen, it is not desirable for consumer applications due to the use of methane and the high temperature process involved.

Numerous other options have been suggested in the art for the production of hydrogen. Other feedstocks, such as methanol, may be employed in reformation processes. While methanol may be a more preferred feedstock than methane in certain consumer applications, issues remain regarding the reformation process itself.

Alternatively, electricity may be used to electrolyze water (which is an inexpensive, benign feedstock) to generate hydrogen; however, difficulties exist in achieving efficient, economic production in this manner.

SUMMARY

Embodiments of the present invention relate to a method of generating hydrogen including contacting magnesium and silicon, sufficient to form a mixture and reacting the mixture with an aqueous solution, sufficient to generate hydrogen. The solution may include water and a salt.

Embodiments also relate to a composition for the generation of hydrogen via hydrolysis including a mixture of magnesium and silicon. The composition reacts to generate hydrogen when contacted with an aqueous solution.

Also described is a method of generating hydrogen including contacting magnesium, silicon, and a salt sufficient to form a mixture and reacting the mixture with an aqueous solution, the solution comprising water, sufficient to generate hydrogen.

BRIEF DESCRIPTION OF THE DRAWING

FIG. 1 illustrates a graphical view of the hydrogen flow rate versus time plot for an exemplary silicon-containing mixture to that of a comparative mixture containing no silicon, according to some embodiments of the invention.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense, and the scope of the present invention is defined by the appended claims and their equivalents.

In this document, the terms "a" or "an" are used to include one or more than one and the term "or" is used to refer to a nonexclusive "or" unless otherwise indicated. In addition, it is to be understood that the phraseology or terminology employed herein, and not otherwise defined, is for the purpose of description only and not of limitation. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference should be considered supplementary to that of this document; for irreconcilable inconsistencies, the usage in this document controls.

Embodiments of the invention relate to methods for generating hydrogen via hydrolysis. The method comprises preparing a mixture of magnesium and silicon, and reacting the mixture with an aqueous solution comprising water and a salt. The combination of magnesium and silicon may provide for a greater amount of generated hydrogen than would be expected from either component alone. The silicon in the mixture may be crystalline, even though crystalline silicon on its own is generally unreactive in such aqueous solution.

In some embodiments, the mixture may contain a salt in addition to magnesium and silicon. In such embodiments, unexpected results (similar to those achieved by contacting a mixture of magnesium and silicon with an aqueous solution comprising water and a salt) may be achieved by contacting the mixture with water (instead of an aqueous solution comprising water and a salt). In such embodiments, the mixture may be prepared by contact milling the magnesium and silicon together, and then mixing the salt with the mixture after the contact milling is complete.

The amount of hydrogen, and rate at which it is generated, may be further improved in any of the embodiments disclosed herein by additionally incorporating a suitable corrosion-facilitating agent in the mixture. Suitable agents include iron, nickel, cobalt, copper, and combinations thereof.

Various hydrolysis reactions have also been suggested in the art. For instance, suitable materials are reacted with water in order to generate hydrogen. Compositions comprising magnesium and a corrosion-enhancing metal (e.g. iron) are well known in the art for purposes of generating hydrogen and/or heat. The presence of a suitable metal in electrical contact with the magnesium can substantially increase the magnesium galvanic corrosion rate (e.g. "Corrosion studies of magnesium and its alloys", Hanawalt et al., Trans. Am. Inst. Mining Met. Eng., 147, 273-99 (1942)).

Silicon and silicon containing alloys may also be used to generate hydrogen. For example, WO2007/054290 discloses means for generating hydrogen by continuously reacting silicon with a substoichiometric amount of alkaline solution in a reaction vessel.

Hydrogen generation via hydrolysis is also disclosed in WO2007/016779 using a variety of microporous metals selected from the group comprising Al, Mg, Si, Fe and Zn and reacting these with water having near-neutral pH. Further, hydrogen generation is disclosed in WO2008/0317665 using metal particles from the same group and reacting these with water in the presence of an effective amount of a catalyst (e.g. a water soluble inorganic salt such as NaCl).

The amount of hydrogen generated by such hydrolysis reactions and the rate at which it is generated may however be limited and insufficient for some practical applications. All the above methods offer certain advantages but also certain disadvantages. There is thus still a need for improved means for generating hydrogen, particularly for consumer applications.

DEFINITIONS

As used herein, a "corrosion-facilitating agent" refers to a material whose presence enhances or facilitates the galvanic corrosion of magnesium in aqueous solution (an end product being hydrogen gas). This material facilitates the corrosion reaction but remains generally unchanged thereafter. The material may, for instance, be selected from the group consisting of iron, nickel, cobalt, copper, and combinations thereof. The aqueous solution may comprise water, or may comprise water and a salt, for example.

As used herein, the term "crystalline" refers to a sufficient degree of crystallinity in a silicon material such that the silicon material is essentially unreactive in neutral aqueous solutions (i.e. no significant generation of hydrogen occurs).

As used herein, "hydrogen generator" refers to a component or components that produce hydrogen when activated by a stimulus. A hydrogen generator may release hydrogen in response to being contacted with a liquid, such as via a hydrolysis reaction. The hydrogen generator may be a thermally activated generator which includes one or more materials that generate or release hydrogen in response to heat. A hydrogen generator may facilitate a galvanic reaction that produces hydrogen and an electric flow. A hydrogen generator may also produce hydrogen in response to an electric flow from a galvanic reaction or from heat. Such materials may chemically or physically bind hydrogen or may produce hydrogen as a product of a chemical reaction. One or more catalysts may be utilized with such materials to facilitate the generation or release of hydrogen. Examples of hydrogen-binding materials include metal hydrides, suitable zeolites, and carbon-based reversible hydrogen-storing materials such as suitable carbon nanotubes, carbon fibers, carbon aerogels, and activated carbon. Examples of materials that may produce hydrogen as a product of a chemical reaction include water, chemical hydrides, hydrocarbon hydrogen carriers, and other suitable hydrogen-containing compounds such as ammonia, amine boranes, alcohols such as methanol and ethanol, and formic acid. Such materials may produce hydrogen via any suitable reactions including without limitation thermolysis, hydrolysis, and electrolysis. In the present invention, a hydrogen generator produces hydrogen via a hydrolysis reaction.

The corrosion of magnesium and magnesium alloys in salt water solutions has been used to produce hydrogen. However, the mechanism by which the magnesium corrodes produces magnesium hydroxide, which has the dual effect of passivating the surface of the magnesium and increasing the pH of the solution (magnesium hydroxide is practically insoluble in water but an aqueous slurry thereof has a pH between 9.5 and 10.5.) As the reaction proceeds, the rate of hydrogen generation slows to a rate which can be prohibitive for the practical generation of hydrogen in a compact system.

While the hydrolysis reaction conceivably can react to completion, the timeframes in which this would happen are impractical for any useful compact system, in particular one used to generate hydrogen for a portable power system, such as a fuel cell system. Consequently, a low overall yield from the magnesium is obtained in a given useful period of time. Advantageously, a practical compact system should be able to store a relatively large amount of hydrogen per unit weight and volume of storage space, yet be able to generate hydrogen at a rate sufficient to generate a desired amount of power.

The rate of hydrogen generation from magnesium in salt water solution can be effectively increased by the addition of iron to the solution. Iron and certain other metals (e.g. Ni, Co, Cu) are corrosion facilitators, and their addition may result in both an increased rate of hydrogen generation and an increased effective yield relative to that obtained without them. However, the addition of iron for instance does not prevent the overall inhibition of hydrogen generation that occurs as the reaction proceeds. Thus, the yield of hydrogen from the magnesium may still be limited as a function of time and may not be sufficient for some applications when iron is added as the sole corrosion facilitator.

Silicon most commonly comes in crystalline form commercially. And in general, such crystalline silicon does not react to generate a significant amount of hydrogen in water or salt water solutions. Under certain conditions though, silicon is known to evolve hydrogen in the presence of water. Extremely reactive silicon (i.e. Si nanoparticles or amorphous silicon) can produce measurable amounts of hydrogen in a salt water solution. Silicon powder evolves detectable amounts of hydrogen when ball milled in water. The rate may be pH dependent and can be significant if the pH>8. (e.g. as reported in "Oxidation of Silicon by Water", Journal of the European Ceramic Soc. 5 (1989) 219-222).

When considering the contributions from the components individually, in a salt water solution, a mixture of magnesium and crystalline silicon might have been expected to generate an amount of hydrogen based essentially only on the amount of magnesium present, because the silicon is essentially unreactive. In a very alkaline solution on the other hand, the same mixture might have been expected to generate an amount of hydrogen based mainly on a modest reaction of the silicon and a very limited reaction of the magnesium.

Embodiments of the present invention describe that certain compositions of magnesium and silicon in salt water solution can yield a greater amount of hydrogen, in useful periods of time, than that expected from the individual magnesium and silicon components. Further, it has been discovered that the addition of silicon to magnesium/iron compositions provides similar enhanced hydrogen yield in salt water solution. Not only can the hydrogen yield be greatly increased, but also the generation rate can be greatly increased, thereby making such mixtures practical for use in applications that benefit from small scale hydrogen generation.

In some embodiments, it has been found that the further addition of a salt to a magnesium and silicon mixture may provide greater than expected amounts of hydrogen generated, in a useful period of time, when the mixture is contacted with water. Such embodiments may further comprise a corrosion facilitating agent in the mixture.

Without being bound by any particular theory, it is hypothesized that the unexpected yield and rate increases may be the result of the silicon reacting with and therefore consuming the hydroxyl species produced during the magnesium hydrolysis. That is, silicon may react with magnesium hydroxide to form magnesium silicates and hydrogen gas, thus increasing the potential for hydrogen generation in excess of a theoretical 100% yield based on the magnesium present. The silicon is thus now reactive and may contribute to the production of hydrogen. Further, the additional heat generated during a silicon—magnesium hydroxide reaction may help drive further magnesium hydrolysis. The consumption of magnesium hydroxide through the silicon reaction provides fresh reaction surfaces on the magnesium, assisting the initial magnesium reaction to proceed more effectively. It is anticipated that the magnesium silicate reaction is more facile than the magnesium hydrolysis reaction, and therefore may serve to enhance the overall hydrogen production rate and increase magnesium utilization per unit time.

Mixtures of the embodiments of the invention may be solid mixtures that are prepared as illustrated in the Examples below. For instance, in some embodiments of the invention, improved hydrogen generation results may be obtained when the ratio of silicon to magnesium in the mixture is less than or equal to about 30:100 parts of silicon to parts of magnesium, by weight, and greater than or equal to about 10:100 parts of silicon to parts of magnesium, by weight. In further embodiments, the ratio of silicon to magnesium in the mixture may be about 15 parts silicon to 100 parts magnesium, by weight.

As in the Examples, suitable magnesium-silicon mixtures may be prepared using powders that may be tumble mixed or attritor milled together and pressed or formed into pellets. The particle size of the powders may be expected to have some effect on the results obtained. Particle size distribution and pellet properties may be tuned to affect the bulk properties of the mixture. For example, the mixture may be tuned to modify properties of flammability, water reactivity, and the ability to self-heat. In some embodiments of the invention, the average particle size of the magnesium and/or silicon powders may be greater than 1 micron. In further embodiments, a 30-100 mesh magnesium powder (having particle sizes of between about 150 and about 500 μm), a 325 mesh iron powder (having particle sizes of about 44 μm or less), and a 325 mesh crystalline silicon powder (having particle sizes of about 44 μm or less) may be used.

The powders may be milled or otherwise processed to obtain sufficient contact between the components in the mixture. Alternatively, suitable mixtures may be prepared using other mechanical means, for example, ball milling, jet milling, attritor milling, impact milling, turbular mixing, crushing, spraying, processing from a liquid form, or processing by other means. Such milling techniques may influence the reaction rate to some extent by enhancing the contact between powder particles. The mixtures may be packed in a container in loose form or alternatively prepared or formed into pellet or puck shapes. Further, amounts of the mixture may be sintered together or even prepared using a melt of the magnesium. In some embodiments of the invention, the powders are subjected to a two-step mixing process. For example, in a first step, magnesium, silicon, and/or one or more corrosion-facilitating agents (e.g., iron) can be processed in an attritor mill to form a mixture and then, in a second step, one or more salts (e.g., sodium chloride and/or calcium chloride) are mixed into the mixture in a turbula mixer. Turbula mixers are available from such companies as Willy A. Bachofen AG, of Muttenz, Switzerland, or Glenn Mills, Inc., of Clifton, N.J.

When an iron corrosion-facilitating agent is employed, improved results may be obtained when the ratio of iron to magnesium in the mixture is, for example, from about 15 parts by weight of iron per 100 parts by weight of magnesium to about 25 parts by weight of iron per 100 parts by weight of magnesium. In a further example, the ratio of iron to magnesium in the mixture may be about 20 parts of iron per 100 parts of magnesium, by weight. While iron may be preferred for reasons such as cost, it is expected that other known galvanic corrosion enhancing materials, e.g. Ni, Co, and Cu, should also be effective agents for enhancing hydrogen generation.

Additives other than corrosion-facilitating agents may be employed in the mixtures. For instance, binders, lubricants, salts, or fire retardants may be included as desired. Such additives may provide mechanical, safety, processing or other advantages, although they may detract somewhat from the hydrogen production rate. For example, thermoplastic binders, such as polytetrafluoroethylene (PTFE) or polyvinylidenefluoride (PVDF), may be added, for example, and may provide increased contacting, structural stability, or elasticity to the mixture.

In order to generate hydrogen, the magnesium-silicon mixture may be reacted with water in a salt water solution using a suitable hydrogen generator apparatus. The hydrogen can be generated in a batch in which desired amounts of Mg—Si mixture and salt water solution are simply mixed together. In this case, the reaction may be allowed to proceed on its own, i.e. uncontrolled. Alternatively, the reacting step may be controlled so as to produce hydrogen according a variable demand. For example, the reacting step may involve incrementally adding (dosing) pellets or other units of mixture to a volume of salt water solution. Or alternatively, units of salt water solution may instead be incrementally added to the mixture.

When the salt used in the aqueous solution is NaCl, improved results may be obtained when the NaCl concentration in the aqueous solution is in the range from greater than about 1% and less than about 20% by weight of the aqueous solution, and particularly when the NaCl concentration is in the range from greater than or equal to about 5% and less than or equal to about 11%, by weight of the aqueous solution. Various other salts may be acceptable alternatives as long as they are soluble in water and as long as they have an anion that forms soluble magnesium salts. For example, one or more salts may be used (e.g., one or more of sodium chloride and calcium chloride).

In embodiments where the mixture includes one or more types of salt in addition to magnesium and silicon, the mixture may be reacted with water or an aqueous solution using a suitable hydrogen generator apparatus to generate hydrogen. The mixture may be reacted with water by contacting a quantity of the mixture with a quantity of water in either a controlled or uncontrolled manner. For example, small quantities of water may be "dosed" onto the fuel pellet, or small pellets of fuel may be "dosed" into a larger quantity of water, at rates which may be constant or may be varied depending on the rate of hydrogen production and/or consumption. Alternatively, a fuel pellet may be contacted with water and allowed to react to completion without any active modulation. When the salt used in the mixture is NaCl, the ratio of salt to magnesium in the mixture may comprise, for example, from about 10 parts of salt per 100 parts of magnesium, by weight, to about 50 parts salt per 100 parts of magnesium, by weight. In such embodiments, the mixture may be contacted with water, rather than with a salt solution to generate hydrogen. In a further example, the ratio of magnesium to salt may range from about 9:0.1 to about 9:3 by weight. In a further example, the ratio of magnesium to salt may be about 9:2 by weight or about 9:1:1 (wherein the mixture may comprise, for example, 9 parts of magnesium to about 1 part sodium chloride and about 1 part calcium chloride).

Various apparatus and configurations may be used to implement the method. For instance, a hydrogen generator apparatus related to that disclosed in US20080160360 for generating hydrogen using boron hydride reactants may be employed. Such apparatus may be adapted and modified (e.g. without the storage region for accumulated fluid) so as to be suitable for this application. Alternatively, hydrogen generator apparatus may be employed like that disclosed in commonly-owned US published patent application number 2007/0084879 and titled "Hydrogen Supplies and Related Methods", which is herein incorporated by reference in its entirety. In such an embodiment, the hydrogen generated from the reaction may be fed into a hydrogen reservoir and stored, for example, as compressed hydrogen or in a hydrogen storage alloy.

The hydrogen generated using the method may be utilized to provide fuel to a fuel cell system, either directly (e.g. fed to a fuel cell) or indirectly (e.g. to refuel a hydrogen-storing fuel cartridge). When coupled to a fuel cell, the hydrogen generator and fuel cell may together form a portable power source, or be used to provide electric power to any number of electronic devices, or alternately may be used to power larger devices such as vehicles. The generated hydrogen may alternatively be used for any number of purposes. Hydrogen generator apparatus utilizing the method for generating hydrogen may alternately be used in applications such as reconnaissance balloons, weather balloons, and portable heaters, for example. Embodiments of the present invention may also be utilized for apparatus or processes that efficiently generate heat, such as portable heat activation devices.

The following Examples have been included to illustrate certain aspects of the invention, but should not be construed as limiting in any way.

Example 1

A series of magnesium-silicon mixtures was prepared in pellet form using coarse mesh magnesium (Mg) powder from Magnesium Elektron, of Manchester, England, (99.8% grade) and finer 325 mesh crystalline silicon (Si) powder from Martin Marietta Minerals, of Raleigh, N.C., (99.0-99.3% grade). The pellets employed the same amount of Mg but different amounts of Si. The powders were tumble mixed together in advance of pressing the mixture into pellets.

Pellets were prepared using 1 gram of magnesium and either no silicon, or 0.15 grams of silicon plus a small amount of Kynar® 2851 flex (PVDF) (available from Arkema, Inc. of Philadelphia, Pa.) powder binder. Appropriate dry powder mixtures were then hot-pressed into 2.13 cm diameter pellets at 7.5 tons for 2 minutes in a 4-piston mold preheated to 180° C. The resulting pellets had densities in the range of 1.51-1.55 g/cc, and were slightly brittle and hydrophobic.

Two different aqueous NaCl solutions were used to hydrolyze the samples; namely 5% and 11% NaCl solutions. The amount of solution used in each case was 6 mL.

Each sample was then hydrolyzed for approximately 30 minutes or until the hydrogen flow dropped below the detection range of the instrumentation, whichever came first. (Of course, it is expected that hydrogen would continue to be produced at some rate thereafter, until eventually all the magnesium had been reacted with water. However, if it took longer than 30 minutes to produce or was produced at rates below this detection range, this generated hydrogen was believed to be impractical for commercial applications.) The product gas flow and temperature of the solution over the reaction period were measured over time in each case. Table 1 below shows the average temperature over the reaction period and also shows values for the hydrogen yield at two different times over the reaction period, i.e. at 10 minutes and at the end of the reaction period. For purposes of comparison, the hydrogen yield has been presented relative to the theoretical yield based on the amount of magnesium present alone. Thus, if the silicon in the mixture does not result in the production of any hydrogen, the maximum theoretical yield should be 100%. In Table 1 then, the yield values at the 10 minute mark provide a relative indication of the differences in the rate of hydrogen generation. And the yield values at the end of the reaction period provide a relative indication for the total hydrogen yield obtained over a practically useful period of time.

TABLE 1

| Mixture composition | [NaCl] | Average temperature (° C.) | Yield (% of theoretical from Mg) at 10 minutes | Yield (% of theoretical from Mg) at 30 minutes or detection threshold |
|---|---|---|---|---|
| 1 g Mg | 5% | 29 | 0.6 | <1 |
| 1 g Mg + 0.15 g Si | 5% | 30 | 4.8 | 5 |
| 1 g Mg | 11% | 28 | 0.6 | <1 |
| 1 g Mg + 0.15 g Si | 11% | 31 | 5.4 | 8 |

Note:
0.15 g amounts of silicon on its own in the preceding salt solutions did not produce any detectable hydrogen in experiment testing.

As shown in Table 1, the presence of silicon resulted in a dramatic increase in hydrogen yield and in the rate at which the hydrogen was generated.

Example 2

Another series of magnesium-silicon mixtures in pellet form was prepared in a similar method as described in Example 1, above, except that in this example, iron was additionally used in each pellet (also, no binder or hot pressing was used to prepare the pellets here, although slightly higher pressing force was used.) 0.2 g of 10 micron size iron powder from Alfa Aesar (Ward Hill, Mass.) was included in each pellet. In this series, a third amount of silicon (0.3 g) was tested in the pellets as well.

Each pellet sample was hydrolyzed in a similar manner to that of Example 1 and the data obtained is summarized in Table 2 below. (Note that yields above 100% must involve reactions of the silicon to produce additional hydrogen gas, e.g. with magnesium hydroxide to produce hydrogen gas and magnesium silicates, and thereby increasing total yield and hydrogen production rate over a given period of time.) FIG. 1 compares the hydrogen flow rate versus time plots for an exemplary mixture of the invention (denoted Mg+Fe+Si) to that for a comparative mixture (denoted Mg+Fe). Specifically, the former is for the 1 g Mg+0.2 g Fe+0.15 g Si mixture in Table 2 and the latter is for the 1 g Mg+0.2 g Fe mixture, both of which were hydrolysed in 11% NaCl. FIG. 1 shows an unexpected and surprisingly large amount of hydrogen produced with some embodiments of the instant invention.

TABLE 2

| Mixture composition | [NaCl] | Average temperature (° C.) | Yield (% of theoretical from Mg) at 10 minutes | Yield (% of theoretical from Mg) at 30 minutes or detection threshold |
|---|---|---|---|---|
| 1 g Mg + 0.2 g Fe | 5% | 35 | 7 | 12 |
| 1 g Mg + 0.2 g Fe + | 5% | 86 | 72 | 108 |

TABLE 2-continued

| Mixture composition | [NaCl] | Average temperature (° C.) | Yield (% of theoretical from Mg) at 10 minutes | Yield (% of theoretical from Mg) at 30 minutes or detection threshold |
|---|---|---|---|---|
| 1 g Mg + 0.2 g Fe + 0.15 g Si | | | | |
| 1 g Mg + 0.2 g Fe + 0.30 g Si | 5% | 84 | 74 | 124 |
| 1 g Mg + 0.2 g Fe | 11% | 81 | 41 | 97 |
| 1 g Mg + 0.2 g Fe + 0.15 g Si | 11% | 86 | 87 | 108 |
| 1 g Mg + 0.2 g Fe + 0.30 g Si | 11% | 83 | 60 | 118 |

When compared to Example 1, Table 2 shows that use of Fe corrosion-facilitating agent increases the hydrogen yield from the Mg samples. But again, the presence of silicon results in a further dramatic increase in hydrogen yield and generation rate. And, FIG. 1 exemplifies the marked improvement in hydrogen production rate for the Si containing mixtures of the invention.

The above description is intended to be illustrative, and not restrictive. Other embodiments can be used, such as by one of ordinary skill in the art upon reviewing the above description. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the invention should be determined with reference to the appended claims, along with the full scope of equivalents to which such claims are entitled.

Example 3

In another exemplar embodiment of the invention, a pellet comprising a magnesium-silicon mixture, as well as iron, sodium chloride, and potassium chloride may be formed. For example, 100 parts 30-100 mesh magnesium powder (e.g. from TangShan WeiHao Magnesium Powder Co., Ltd of Tangshan, Hebei Province, China), 15 parts 325 mesh silicon (e.g. from Martin Marietta Minerals of Raleigh, N.C.), and 25 parts 325 mesh iron (e.g. from Sagwell of Chengdu, China) may be mixed using an attritor mill for a period of time, for example 10-30 minutes, or about 20 minutes. As used herein, "30-100 mesh" refers to that portion of the magnesium powder that sifts through a 30 sieve or mesh screen but not through a 100 sieve or mesh screen. In some embodiments, the magnesium powder is in the form of atomized spherical magnesium with a 40-100 mesh size, wherein the magnesium particles are first sifted through a 40 sieve or mesh screen and then through a 100 sieve or mesh screen with the magnesium particles used in the invention being that portion that sifts through the 40 mesh screen but not through the 100 mesh screen. Removing the smaller portion of the powder can be useful for producing consistent properties (e.g., controlling the reactivity and flammability of the resulting pellets).

The mixture may then be mixed with salt. For example, 9 parts by weight metal mixture may be mixed with 1 part by weight sodium chloride and 1 part by weight potassium chloride using a turbula mixer for a period of time, for example 15-45 minutes, or about 30 minutes. The salted mixture may then be pressed into pellets using a desired pressure. For example, the pellets may be pressed using a pressure of about 20,000-70,000 psi, or about 50,000 psi.

The Abstract is provided to comply with 37 C.F.R. §1.72 (b), to allow the reader to quickly ascertain the nature of the technical disclosure. It is submitted with the understanding that it will not be used to interpret or limit the scope or meaning of the claims.

What is claimed is:

1. A method of generating hydrogen comprising:
   (i) contacting magnesium, silicon and a corrosion-facilitating agent sufficient to form a mixture;
   (ii) processing the magnesium, silicon and corrosion-facilitating agent to enhance the contact between the magnesium, silicon and corrosion-facilitating agent; and
   (iii) reacting the mixture with an aqueous solution and one or more salts, the solution comprising water, sufficient to generate hydrogen,
   wherein the average particle size of magnesium is from about 150 microns to about 500 microns, the average particle size of silicon is less than about 44 microns, and the average particle size of the corrosion-facilitating agent is less than about 44 microns.

2. The method of claim 1, wherein the corrosion-facilitating agent is selected from the group consisting of iron, nickel, cobalt, copper, and combinations thereof.

3. The method of claim 1, wherein the corrosion-facilitating agent comprises iron.

4. The method of claim 1, wherein the ratio of silicon to magnesium is about 10 parts silicon to 100 parts magnesium to about 30 parts silicon to 100 parts magnesium.

5. The method of claim 1, wherein the ratio of corrosion-facilitating agent to magnesium is from about 15 parts corrosion-facilitating agent to 100 parts magnesium to about 25 parts corrosion-facilitating agent to about 100 parts magnesium.

6. The method of claim 1, wherein in step (iii) the one or more salts is mixed with the aqueous solution.

7. The method of claim 6, wherein the salt concentration is from about 1% to about 20% by weight of the aqueous solution.

8. The method of claim 7, wherein the salt concentration is from about 5% to about 11%.

9. The method of claim 1, wherein step (ii) comprises a milling step.

10. The method of claim 1, wherein in step (iii) the one or more salts is mixed with the magnesium, silicon and corrosion-facilitating agent.

11. The method of claim 10, wherein the magnesium, silicon, and corrosion-facilitating agent are contacted during an initial contacting process to form a precursor mixture and the salt is contacted with the precursor mixture in a second contacting process to form a final mixture.

12. The method of claim 10 further comprising forming the final mixture into a pellet.

13. The method of claim 10, wherein the mixture further comprises at least one of the following:
   (a) a potassium chloride salt,
   (b) a fire retardant,
   (c) a processing agent,
   (d) a binder, or
   (e) a lubricant.

14. A composition comprising a mixture of magnesium, silicon and a corrosion-facilitating agent, wherein the average particle size of magnesium is from about 150 microns to about 500 microns; the average particles size of silicon is less than about 44 microns; and the average size of the corrosion-facilitating agent is less than about 44 microns.

15. The composition of claim 14, wherein the ratio of silicon to magnesium is about 10 parts silicon to 100 parts magnesium to about 30 parts silicon to 100 parts magnesium.

16. The composition of claim 14, wherein the ratio of corrosion-facilitating agent to magnesium is from about 15 parts corrosion-facilitating agent to 100 parts magnesium to about 25 parts corrosion-facilitating agent to about 100 parts magnesium.

17. The composition of claim 14, wherein the corrosion-facilitating agent is selected from the group consisting of iron, nickel, cobalt, copper, and combinations thereof.

18. The composition of claim 14, wherein the one or more salts is mixed with the magnesium, silicon and corrosion-facilitating agent.

19. The composition of claim 14, wherein one of the salts is potassium chloride.

20. The method of claim 1, wherein the silicon comprises crystalline silicon.

\* \* \* \* \*